(12) United States Patent
Cann et al.

(10) Patent No.: US 6,514,445 B1
(45) Date of Patent: Feb. 4, 2003

(54) BRUSH MAKING

(75) Inventors: David Victor Cann, Egham Surrey (GB); Kilian John O'Neill, Egham Surrey (GB); Roland Stark, Egham Surrey (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/331,815

(22) PCT Filed: Dec. 12, 1997

(86) PCT No.: PCT/US97/22683

§ 371 (c)(1),
(2), (4) Date: Jun. 24, 1999

(87) PCT Pub. No.: WO98/27847

PCT Pub. Date: Jul. 2, 1998

(30) Foreign Application Priority Data

Dec. 24, 1996 (GB) .............................................. 9626862

(51) Int. Cl.⁷ .............................................. B29C 45/14
(52) U.S. Cl. ........................ 264/243; 264/247; 264/267; 264/273
(58) Field of Search ................................ 264/267, 273, 264/247, 243; 15/167.1, 172; 300/21

(56) References Cited

U.S. PATENT DOCUMENTS

| 669,402 A | 3/1901 | Rose |
| 759,490 A | 5/1904 | Yates |
| 876,317 A | 1/1908 | Booth |
| 882,021 A | 3/1908 | Schigelinsky |
| 914,501 A | 3/1909 | McEachern |
| 924,194 A | 6/1909 | Schwartz |
| 1,018,927 A | 2/1912 | Sarrazin |
| 1,337,173 A | 4/1920 | White |
| 1,440,785 A | 1/1923 | Levis |

(List continued on next page.)

FOREIGN PATENT DOCUMENTS

| DE | 3737223 A1 | 5/1989 |
| DE | 9319292.4 | 3/1994 |
| DE | 9400926 | 5/1994 |
| DE | 9318148.5 | 5/1994 |
| DE | 9400231.2 | 5/1994 |
| DE | 9402125.2 | 7/1994 |
| EP | 0 336 641 A2 | 10/1989 |
| EP | 0 577 656 B1 | 5/1997 |

(List continued on next page.)

OTHER PUBLICATIONS

Technical Data Sheet for Dynaflex® G2706 from www.glscorporation.com; pp. 1–2.*
Handbook of Common Polymers (Section 2:Polypropylene), p. 26, 1971.*
Technical Data Sheet for Dynaflex® G2706, Thermoplastic Rubber Compound, GLS Corporation, 2 pgs.
Technical Data Sheet for Dynaflex® G2711, Thermoplastic Rubber Compound, GLS Corporation, 2 pgs.
Technical Data Sheet for Dynaflex® G2712, Thermoplastic Rubber Compound, GLS Corporation, 2 pgs.
Technical Data Sheet for Dynaflex® G2735, Thermoplastic Rubber Compound, GLS Corporation, 10 pgs.
Kraiburg, Everything at a glance, pp. 2–19, Sep. 1994.

*Primary Examiner*—Jan H. Silbaugh
*Assistant Examiner*—Edmund H. Lee
(74) *Attorney, Agent, or Firm*—James C. Vago

(57) ABSTRACT

A process for forming a grooming implement is provided. The steps include providing a blank having a head and a handle, wherein the head has one or more void spaces which divide said head into at least two segments, and injecting an elastomer into the void space at a temperature of at least about 245° C. thereby fusing the elastomer to the segments and forming a resiliently flexible joint. The elastomer is the sole mechanical link between the segments such that the segments can flex relative to each other and the elastomer can be stretched to about 120% of its unstressed length without separation of the elastomer from the segments.

28 Claims, 3 Drawing Sheets

U.S. PATENT DOCUMENTS

| | | |
|---|---|---|
| 1,456,535 A | 5/1923 | Cartwright |
| 1,642,465 A | 9/1927 | Sheetz |
| 1,724,955 A | 8/1929 | Mitchell |
| 1,860,924 A | 5/1932 | Cooke |
| 1,901,646 A | 3/1933 | Hicks |
| 1,927,365 A | 9/1933 | Frolio |
| 2,003,243 A | 5/1935 | Campbell et al. |
| 2,122,619 A | 7/1938 | McMath |
| 2,125,783 A | 8/1938 | Heeman |
| 2,154,352 A | 4/1939 | Peterson |
| 2,172,624 A | 9/1939 | Robert |
| 2,179,266 A | 11/1939 | Lukenbill |
| 2,242,743 A | 5/1941 | Brown |
| 2,254,365 A | 9/1941 | Griffith et al. |
| 2,266,195 A | 12/1941 | Hallock |
| 2,274,042 A | 2/1942 | Cosby |
| 2,326,632 A | 8/1943 | Friedman |
| 2,438,268 A | 3/1948 | Bressler |
| 2,443,297 A | 6/1948 | Bressler |
| 2,650,383 A | 9/1953 | Bressler |
| 2,676,350 A | 4/1954 | Bressler |
| 2,685,703 A | 8/1954 | Dellenbach |
| 2,722,031 A | 11/1955 | Bressler |
| 2,807,820 A | 10/1957 | Dinhofer |
| 3,082,457 A | 3/1963 | Lucibello et al. |
| 3,129,449 A | 4/1964 | Cyzer |
| 3,152,349 A | 10/1964 | Brennesholtz |
| 3,188,672 A | 6/1965 | Gary |
| 3,188,673 A | 6/1965 | Newman |
| D201,867 S | 8/1965 | Newman |
| 3,253,292 A | 5/1966 | Herschensohn |
| 3,279,858 A | 10/1966 | Parker |
| 3,306,670 A | 2/1967 | Zahoransky |
| 3,378,870 A | 4/1968 | Matsunaga |
| 3,398,421 A | 8/1968 | Rashbaum |
| 3,583,019 A | 6/1971 | Conklin, Jr. |
| 3,614,165 A | 10/1971 | Ebser |
| 3,667,809 A | 6/1972 | Fulcher |
| 3,678,528 A | 7/1972 | Haije |
| 3,722,020 A | 3/1973 | Hills |
| 3,742,549 A | 7/1973 | Scopp et al. |
| 3,792,504 A | 2/1974 | Smith |
| 3,914,081 A | 10/1975 | Aoki |
| D238,977 S | 2/1976 | Barthey |
| D239,221 S | 3/1976 | Wasserman |
| 4,020,521 A | 5/1977 | Velasquez |
| 4,031,587 A | 6/1977 | Dietrich |
| 4,081,876 A | 4/1978 | Pugh |
| D248,696 S | 8/1978 | Greenberg |
| 4,240,452 A | 12/1980 | Jean |
| D259,976 S | 7/1981 | Seelig |
| 4,283,808 A | 8/1981 | Beebe |
| 4,288,883 A | 9/1981 | Dolinsky |
| 4,416,166 A | 11/1983 | Jannard et al. |
| D272,688 S | 2/1984 | Stocchi |
| D272,689 S | 2/1984 | Stocchi |
| D272,690 S | 2/1984 | Stocchi |
| D273,635 S | 5/1984 | Stocchi |
| D276,193 S | 11/1984 | Tanabe et al. |
| 4,488,328 A | 12/1984 | Hyman |
| 4,520,526 A | 6/1985 | Peters |
| 4,570,282 A | 2/1986 | Kaufman et al. |
| 4,573,920 A | 3/1986 | D'Argembeau |
| D285,263 S | 8/1986 | Hill |
| 4,633,542 A | 1/1987 | Taravel |
| 4,646,381 A | 3/1987 | Weihrauch |
| D289,703 S | 5/1987 | Yaffe |
| D289,704 S | 5/1987 | Marthaler et al. |
| 4,691,405 A | 9/1987 | Reed |
| 4,694,844 A | 9/1987 | Berl et al. |
| D292,448 S | 10/1987 | Vianello | |
| 4,712,267 A | 12/1987 | Cheng | |
| 4,712,304 A | 12/1987 | Sanelli | |
| 4,721,021 A | 1/1988 | Kusznir | |
| 4,734,230 A | 3/1988 | Rhodes, Jr. et al. | 264/46.4 |
| 4,739,536 A | 4/1988 | Bandera et al. | |
| 4,766,054 A | 8/1988 | Hirose et al. | |
| 4,768,837 A | 9/1988 | Boucherie | |
| 4,800,608 A | 1/1989 | Key | |
| 4,829,621 A | 5/1989 | Phenegar | |
| 4,847,936 A | 7/1989 | Moglianesi et al. | |
| 4,864,676 A | 9/1989 | Schaiper | |
| 4,882,803 A | 11/1989 | Rogers et al. | |
| 4,894,880 A | 1/1990 | Aznavoorian | |
| 4,949,457 A | 8/1990 | Burout, III | |
| 5,014,383 A | 5/1991 | Costar | |
| 5,027,511 A | 7/1991 | Miller | |
| D319,148 S | 8/1991 | Emily | |
| 5,046,212 A | 9/1991 | O'Conke | |
| 5,046,213 A | 9/1991 | Curtis et al. | |
| 5,052,071 A | 10/1991 | Halm | 15/167.1 |
| 5,054,154 A | 10/1991 | Schiffer et al. | 15/167.1 |
| D324,775 S | 3/1992 | Kreisher et al. | |
| 5,114,214 A | 5/1992 | Barman | |
| 5,242,235 A | 9/1993 | Li | |
| 5,261,665 A | 11/1993 | Downey | |
| D342,160 S | 12/1993 | Curtis et al. | |
| D342,162 S | 12/1993 | Curtis et al. | |
| 5,305,489 A | 4/1994 | Lage | |
| 5,305,490 A | 4/1994 | Lundgren | |
| 5,339,482 A * | 8/1994 | Desimone et al. | 15/167.1 |
| D351,732 S | 10/1994 | Dair et al. | |
| 5,353,464 A | 10/1994 | Atkins et al. | |
| 5,355,546 A | 10/1994 | Scheier et al. | |
| 5,373,602 A | 12/1994 | Bang | |
| 5,390,572 A | 2/1995 | Gakhar et al. | |
| 5,392,483 A | 2/1995 | Heinzelmann et al. | |
| 5,398,368 A | 3/1995 | Elder | |
| 5,398,369 A | 3/1995 | Heinzelman et al. | 15/167.1 |
| D360,760 S | 8/1995 | Halm | |
| 5,483,722 A | 1/1996 | Scheier et al. | |
| 5,511,275 A | 4/1996 | Volpenhein et al. | |
| 5,533,227 A | 7/1996 | Ito et al. | |
| 5,630,244 A | 5/1997 | Chang | |
| 5,651,158 A | 7/1997 | Halm | 15/167.1 |
| D388,253 S | 12/1997 | Ra | |
| D391,769 S | 3/1998 | Kling et al. | |
| 5,742,972 A | 4/1998 | Bredall et al. | |
| 5,758,383 A * | 6/1998 | Hohlbein | 15/167.1 |
| 5,761,759 A | 6/1998 | Leversby et al. | |
| D396,145 S | 7/1998 | Grau et al. | |
| 5,774,923 A | 7/1998 | Halm | |
| 5,813,079 A | 9/1998 | Halm | |
| 5,839,149 A * | 11/1998 | Scheier et al. | 15/167.2 |
| D407,222 S | 3/1999 | Van Gelder | |
| 5,946,758 A | 9/1999 | Hohlbein et al. | |
| 5,946,759 A | 9/1999 | Cann | |
| 5,991,958 A | 11/1999 | Hohlbein | |
| 6,006,394 A | 12/1999 | Bredall et al. | |
| D421,844 S | 3/2000 | Stark et al. | |
| 6,073,299 A | 6/2000 | Hohlbein | |
| 6,115,870 A | 9/2000 | Solanki et al. | |
| 6,178,582 B1 * | 1/2001 | Halm | 15/167.1 |

FOREIGN PATENT DOCUMENTS

| | | |
|---|---|---|
| EP | 0 708 609 B1 | 12/1998 |
| EP | 0 580 406 B1 | 9/1999 |
| FR | 442832 | 9/1912 |
| FR | 567187 | 2/1924 |
| FR | 792476 | 12/1935 |
| FR | 1431088 | 1/1966 |

| | | | | | | |
|---|---|---|---|---|---|---|
| FR | 2232284 | 1/1975 | | WO | WO97-07707 A1 | 3/1997 |
| GB | 471387 | 9/1937 | | WO | WO97-10938 A1 | 3/1997 |
| KR | 71 844 | 6/1971 | | WO | WO97/24048 A1 | 7/1997 |
| SE | 460705 | 10/1968 | | WO | WO97/25900 A1 | 7/1997 |
| WO | WO92-17092 A1 | 10/1992 | | WO | WO97-29663 A1 | 8/1997 |
| WO | 92/17093 * | 10/1992 | | WO | WO97/38840 A1 | 10/1997 |
| WO | WO93-14671 A1 | 8/1993 | | WO | WO98/58563 A1 | 12/1998 |
| WO | WO94-05183 A1 | 3/1994 | | WO | WO99-23910 A1 | 5/1999 |
| WO | WO94-09678 A1 | 5/1994 | | WO | WO99-37182 A1 | 7/1999 |
| WO | WO95-06420 A1 | 3/1995 | | WO | WO00-57747 A1 | 10/2000 |
| WO | WO96-10577 A1 | 1/1996 | | | | |
| WO | WO96-02165 A1 | 2/1996 | | | | |
| WO | WO97-07706 A2 | 3/1997 | | | | |

* cited by examiner

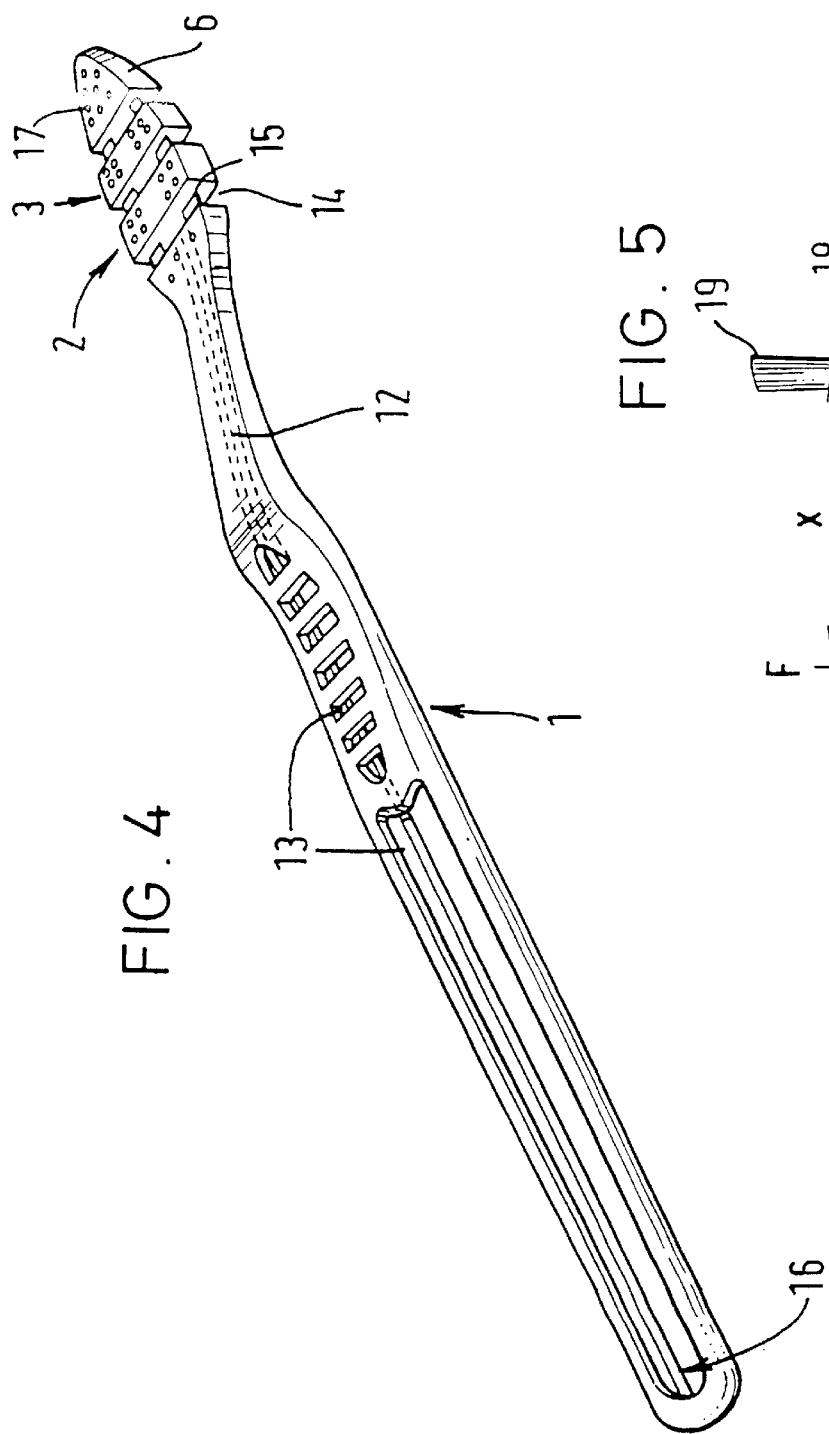

BRUSH MAKING

FIELD OF THE INVENTION

The present invention relates to a process for making two component, injection moulded personal grooming implements, especially toothbrushes. In particular it relates to a process for improving the adhesion between thermoplastics and thermoplastic elastomers so that flexible joints between the materials in the neck or head of the implement can withstand repeated flexing without loss of adhesion at the joint. The invention further relates to two component, injection moulded personal grooming implements having high levels of adhesion between the components.

BACKGROUND OF THE INVENTION

The configuration of human teeth requires that the ideal bristle contour for toothbrushes for brushing the buccal or outside surfaces of teeth be concave and that the ideal bristle contour for brushing the lingual or inside surfaces of teeth be convex. Yet, most brushes are still of relatively rigid, single piece construction and of fixed configuration. The bodies of toothbrushes and similar implements are typically made from polypropylene or similar thermoplastic materials.

In many brushes a second, elastomeric component, such as a thermoplastic elastomer, is employed in the handle to aid grip or to provide a distinctive appearance. The two component brush is typically now made by injection moulding, such as described in "Zahoransky's fully automatic two-colour mould". Brossa Press (1989). The process typically involves a first moulding step in which a thermoplastic body is made, incorporating voids to accept the elastomer. In a second step, the elastomer is injected into the voids where it will typically become partially mechanically anchored, on cooling and setting, and also fused to the thermoplastic body. In the handle, the demands on the joint between the thermoplastic body and the elastomer are, typically, not high.

Brushes have, however, been described that incorporate a link for allowing the head to flex relative to the handle, as described for example in EP-A-371,293 to EP-A-613,636. In the brushes described therein the flexible linking employs an elastomer to aid or modify flexibility and the joint between the elastomer and the body will be subject to greater stress.

WO 92/17092, WO 92/17093 and WO 96/02165 disclose toothbrushes having resiliently flexible, bristle-bearing heads, the heads, in certain embodiments being in the form of two or more segments which are flexibly and resiliently linked to each. Gaps between the segments can be wholly or partially filled with an elastomer. In brushes of the type of construction the bond between the elastomer and the body can be subject to great stress, repeatedly applied through frequent use. However, none of the aforementioned documents describes how to achieve a robust joint between the two materials which will stand up to repeated use.

It has now surprisingly been found that the strength of fusion between the elastomer and the brush body can be substantially improved by raising the elastomer injection temperature above the range from 190° C.–210° C. customarily employed, without thermal degradation of the elastomer.

It is accordingly an object of this invention to provide a process for making two component, injection moulded personal grooming implements which can flex resiliently and which had good long-term durability.

It is a further object of this invention to provide a two component, injection moulded personal grooming implement having increased strength of fusion between a plastic body and an elastomer.

SUMMARY OF THE INVENTION

According to one aspect of the present invention there is provided a process for forming a resiliently flexible joint in the handle or head of a personal grooming implement; the implement comprising a handle having two ends, and at one end thereof, a head comprising a grooming means; the process comprising the steps of:

i) providing an implement blank including at least one region of plastic material defining a void space in the head or the handle; and ii) injecting an elastomer into the void space at a temperature of at least 245° C. thereby fusing the elastomer to the plastic material and forming the resiliently flexible joint.

According to a second aspect of the invention there is provided a personal grooming implement having an elongated handle and a head disposed at one end thereof, the head comprising a grooming means; the handle or head including a resiliently flexible joint between a first region made from a plastic material with a Vicat softening point of less than 245° C., and a second region made from an elastomer, wherein the elastomer is fused to the plastic material such that the elastomer can be stretched to 120% of its unstressed length without separation of the elastomer from the plastic material.

The process of this invention provides improved adhesion between the elastomer and the plastic components so that flexible joints where the two components are bonded together by fusion are better able to withstand repeated flexing without degradation of the bond. The durability of the implement is thereby improved.

DETAILED DESCRIPTION OF THE INVENTION

The personal grooming implement of this invention can be any implement of the type that has a sufficiently elongated handle for the user to grip and, disposed at one end of the handle, a head comprising a grooming means. The implement can, for example be a toothbrush, hairbrush or a massaging implement. More especially, it is a toothbrush.

The head comprises a grooming means. The grooming means can take the form of bristles, combing teeth, polishing materials, rubber massage pads and the like. In preferred embodiments herein the implement is a toothbrush wherein the grooming means comprises a plurality of bristles extending from the head.

The head can be detachably connected to the handle, for example to permit replacement of the head when bristles become worn, in which case the head has a point of attachment for the handle. The head can comprise a multiplicity of connected segments. A first head segment can be continuous with the handle. In a preferred embodiment the handle and first head segment is a single piece formed by injection moulding. Preferably, the handle and all of the head segments are formed within a single mould by injection moulding. In any case the handle has a longitudinal axis extending between its two ends. This axis also defines the longitudinal axis of the head which is co-extensive with the axis of the handle. Preferably the head is of generally flattened construction having a pair of opposing faces and the head also has a transverse axis lying orthogonal to the longitudinal axis and generally parallel to the opposed faces. References to transverse or longitudinal herein refer to directions which are respectively parallel to these transverse and longitudinal axes, unless indicated otherwise.

An essential feature of the implement of this invention, and of the process for forming an implement is that the implement, or the implement thereby formed, includes a resiliently flexible joint in the handle or the head, the joint comprising a plastic material and an elastomer. By "resiliently flexible joint" herein is meant a region comprising both plastic material and elastomer which is able to articulate on the application of a force experienced under normal usage conditions for the implement, and further, that when the force is removed the implement will return to essentially the same starting configuration within 60 seconds, preferably within 30 seconds. Preferably the head includes such a resiliently flexible joint.

The head and handle are generally made of relatively non-compressible materials, preferably with a modulus of elasticity of at least about 500 MPa, more preferably at least about 1000 MPa, which are conventional in the manufacture of toothbrushes, especially plastic materials. Especially the plastic material has a Vicat softening point of less than 245° C., more preferably less than 220° C. and especially less than 200° C. Suitable plastic materials include, for example, polyamides and polypropylenes. Polypropylene is preferred. Suitable polypropylenes include the material 'Polypropylene PM 1600' (marketed by Shell), having a modulus of elasticity (ISO 178) of 1500 MPa and Apryl 3400 Ma1 from Elf Atochem. Preferably, a foaming agent such as Hydrocerol HP20DP from Boehringer-Mannheim is mixed with the polypropylene at a level of from about 1% to about 3%, preferably from about 1.5% to about 2.5%, by weight of the polypropylene. The foaming agent assists the flow of the polypropylene during moulding and, in particular, helps to ensure uniform formation of hinges, where used. The handle itself is generally rigid and may be of a shape which is conventional in the manufacture of toothbrushes. Optionally, the handle may comprise a neck portion which is more flexible than the rest of the handle, for example by inclusion of a flexible joint as described herein.

In a first step of the process according to the invention, an implement blank is provided which includes at least one region of plastic material defining a void space in the head or the handle. The implement blank is essentially the implement before injection of the elastomer and, optionally, before other finishing processes, such as attachment of the grooming means. The at least one region of plastic material can be the whole of the implement blank or some smaller portion of it. Suitable plastic materials are described hereinabove. The void space can be a simple groove in the head or a more complex shape. It should be of dimensions such that the head or handle is weakened or otherwise made flexible at that point. In preferred embodiments herein the implement blank includes one or more void spaces in the form of grooves or gaps which divide the head into segments. Preferably there are two, three or four segments, more preferably four. Many more than this increases the manufacturing complexity and, in a toothbrush where bristle tufts are inserted only into the head segments, makes it difficult to achieve a sufficiently high tuft density on the brush head. The head segments can have any suitable spatial relationship to each other such as being in layers or arranged, for example, in quadrants of the brush head. Preferably, the segments are disposed in longitudinal sequence along the head so that a longitudinal line drawn from the handle end of the head to the free end of the head passes through the first head segment then the second head segment and so on. More especially, there is a first head segment which is connected to or continuous with the handle and one or more additional head segments arranged in longitudinal sequence towards the free end of the head. Preferably also, the segments are a monolayer so that any line drawn through the head perpendicular to its two opposed faces will generally pass through only one sort of material. In general, each head segment will be made of the same material which will preferably be the same material as the handle so that they can all be made in a single injection moulding step.

In the finished implement, all the head segments are connected by a connecting means. The connecting means can take any form which is suitable for the implement in its intended function, provided that there is at least one resiliently flexible joint where the elastomer is fused to a plastic region. The connecting means can, for example, be adhesive, plastic links which are integral with or detachably connected to the head segments, metal links, or elastomer which is fused to plastic segments. In preferred embodiments herein, at least one of the segments is jointed to an adjacent segment or to the handle by a connecting means consisting essentially of an elastomer having a modulus of elasticity of less than 500 MPa. By "consisting essentially of an elastomer" herein is meant that the elastomer is the sole mechanical link between the one segment and the adjacent segment or handle. By sole mechanical link, what is meant is that there are no continuous, non-elastomeric links such as bridges or springs connecting the segments. The elastomer may, however, have other materials dispersed within it, such as flecks of metal or pigments which might be used, for example, to provide a distinctive appearance. These additional materials will generally make a negligible contribution to the mechanical connection between the segments and/or handle such that their removal would not materially alter the strength of connection. In preferred embodiments there are one or more segments which are unconnected until the elastomer is injected, and the implement blank may comprise several unconnected segments which are held in position relative to each other only by the mould in which the implement blank is prepared and provided. The gaps between the segments are void spaces which, if filled by elastomer, can constitute resiliently flexible joints, so that one segment can articulate relative to another.

In highly preferred embodiments herein the head has a top face and a bottom face and the connecting means consist of bands of elastomer extending transversely across the head and from the top face to the bottom face. For example, in a head comprising four segments, longitudinally sequenced along the head, with the first segment being co-extensive with the handle, there are three such connecting means. The bands of elastomer can vary in thickness, either from one band to the next or even across the width or along the depth of the band. Suitably, their thickness, measured along the longitudinal axis, is in the range from about 0.1 mm to about 10 mm, preferably from about 0.3 mm to about 5 mm, more preferably from about 0.5 mm to about 3 mm.

In alternative embodiments the segments are additionally connected by hinges of the same material as the segments, the hinges being thinner or narrower than segments they connect, and the whole implement blank forming one interconnected piece. There can of course, within the same implement, be some connecting means which comprise hinges and others which consist essentially of an elastomer. The voids between the segments connected by hinges will be referred to herein as grooves.

The grooves can be of variable width and depth and the distances between grooves can also be varied. In this manner the flexibility of the head along the length and/or across the breadth of the head can be modified. Preferably only transverse grooves are varied in this way. Changing the depth of the grooves controls the location and thickness of the hinges which connect the segments. In preferred hinged embodiments the head has a pair of opposing faces with grooves on each face located opposite each other in pairs so that there is a residual hinge between the two faces. For a toothbrush head of between about 4 to about 6 mm thickness, typically about 5 mm, suitable groove depths are in the range from about 1.4 to about 3 mm, preferably from about 1.5 to about 2.8 mm. Suitable hinge thicknesses are in the range from about 0.4 to about 2.0 mm, preferably from about 0.5 to about 1.5 mm. Where transverse grooves are used then, desirably, the hinges which are or will be nearer to the handle are less flexible than those which are or will be more remote from it. In this way more uniform bending of the head can be achieved. The variation in flexibility can be achieved by varying the hinge thicknesses. In a preferred embodiment the hinge nearest the handle is up to about 3 times, preferably up to about 2 times as thick as the hinge most remote from the handle. An exemplary set of hinge thicknesses for a toothbrush with 3 transverse grooves are respectively about 1.2, 0.6 and 0.6 mm reading from the handle end. If identical hinges are used along the brush head then there is a tendency for flexing of the head to occur predominantly at the hinge nearest the handle. The depth of grooves on one face can be different to those on the opposing face.

Increasing the width of the grooves increase the gap between the segments and therefore the length of the hinges, which increases their flexibility. However, since it is preferred for the grooming means, such as bristles, to be supported on the segments rather than on elastomer injected between the segments, increased groove length also leaves less space for the grooming means, within a given head size. Suitable groove widths are in the range from about 0.3 to about 3.0 mm, preferably from about 1.2 to about 2.0 mm. The grooves are preferably tapered slightly inwards towards the bottom of the groove, suitably converging at an angle of from about 3 to about 10°, to facilitate moulding. As the implement is flexed the width of the groove changes, more rapidly at the top of the groove than at the bottom of the groove, the relative change being a function of the groove width and depth. Since this change in groove width results in compression or tension of elastomer contained within the groove, it can be seen that, for a given elastomer, the groove geometry can be used to control the flexure of the implement.

The hinges can be the full length of the grooves or, preferably, there can be one or more gaps in or to the side of the hinges the grooves in these regions being the full depth of the head. This has the advantage of permitting a single injection point for the elastomer when moulding the head. The gap allows elastomer to flow from one face to the other during the moulding process. In a preferred embodiment, the hinges are discontinuous, with two or more hinges, preferably just two, connecting each segment to its neighbour or to the handle. In this embodiment there are gaps between the hinges and to each side. In linear grooves, the hinge widths are not generally critical, provided that they are such that gaps are still created, however, wide hinges can be subject to distortion if they are used within a non-linear groove. Suitable hinge widths are in the range from about 0.5 to about 4.0 mm, preferably from about 1.0 to about 3.0 mm.

It is preferred that each hinge is located between the two faces and at a distance of at least about 10%, preferably at least about 20%, more preferably at least about 30% of the depth of the head from each of the faces. The distance of the hinge from the face is measured by the perpendicular line drawn from the top of the face to the nearest boundary surface of the centre of the hinge. Locating the hinges away from the faces of the implement head means that they are subject to less stretching or compression as the head is flexed and improves their durability. In a particularly preferred embodiment, the implement head has transverse grooves which are arranged in pairs such that one member of each pair is on each face and directly opposes the other member of the pair, with one or more hinges therebetween connecting the segments so that each hinge is located between the two faces and at a distance of at least about 10%, preferably at least about 20%, more preferably at least about 30% of the depth of the head from each of the faces.

In a second, essential step of the process according to the invention, elastomer is injected into the void space(s) at a temperature of at least about 245° C., thereby fusing the elastomer to the plastic material and forming the resiliently flexible joint. Preferably the elastomer is injected at a temperature in the range from about 245°. to about 270° C., more preferably in the range from about 250° C. to about 260° C. The injection temperature is the temperature at which the elastomer enters the mould. In a typical injection moulding setup involving a screw-feed injection cylinder this may not be the same as the temperature of the elastomer in the cylinder. Preferably a lower temperature is employed in the cylinder, of around 210° C. to about 220° C., to reduce the possibility of burning or thermal degradation of the elastomer, heating to the final injection temperature being provided via a hot runner between the cylinder nozzle and the final injection point.

Other preferred conditions for the elastomer injection step include:

a) An injection pressure in the range of from about 30 to about 80 MPa, preferably from about 40 to about 70 MPa, more preferably from about 50 to about 60 MPa and an elastomer injection time of less than one second, preferably less than about 0.8 s. Short injection times facilitate the elastomer reaching all the flexible joint areas at the desired temperature.

b) A holding pressure, after the elastomer has been fully injected, in the range of from about 5 to about 15 MPa, preferably from about 8 to about 12 MPa, held for between about 2 to about 5 seconds.

Elastomers are well known in the art of injection moulding. The term "elastomer" herein refers to a material which is both elastically compressible and elastically extensible. For the purposes of this invention, suitable elastomers have a modulus of elasticity of less than 500 MPa. Preferred elastomers for use herein have a modulus of elasticity of less than about 300 MPa, especially preferred are thermoplastic elastomers with a hardness of about 30 Shore A to 74 Shore D, polyolefin types such as styrene-ethylene-butylene-styrene (SEBS) are preferred, for example those based on Kraton® G, but other classes of elastomer, such as polyurethanes and polyamides, can also be used. An exemplary elastomer is 'PTS Thermoflex 75' (marketed by Plastic Technologie Service, Germany), having a modulus of elasticity (ISO 178) of 100 MPa and a hardness (ISO 868) of 80 Shore A. Elastomers PL12291, PL12292, and PL12293 (marketed by Multibase, Saint Laurent Du Pont, France) are also suitable for use herein. In general, choosing the elastomer so that is based upon the same chemical class of polymers as material of the head segments assists in fusing the elastomer to the head segments. For example, when the head segments are made from polypropylene, the elastomer is preferably based upon a polyolefin. The elastomers can optionally be mixed with a suitable plasticiser or foaming agent to make them more compressible. The colour of the elastomer material can be the same as that of the head segments, or it may be different thereby achieving a distinctive striped or otherwise patterned appearance. More than one type of elastomer can be used within the implement as a whole. This may be appropriate, for example when it is desired to modify the head flexibility progressively along its lengths. One way of achieving this is to use a soft elastomer as the connecting means between the pair of segments closest to the free end of the head and a hard elastomer as the connecting means between the pair of segments closest to the handle end of the head.

The elastomer is preferably fused to the adjacent segments and/or to the handle so that the elastomer can be stretched to about 120%, preferably to about 150%, more preferably to about 200% of its unstressed length without separation of the elastomer from the head segments. This makes the present invention particularly suitable for constructing flexible head toothbrushes as will be described further herein. The degree and extend of fusion is sufficient that the elastomer can be stretched to at least abut 120% of its unstressed length without separation of the elastomer from the head segments and/or handle. Preferably at least about 50%, more preferably at least about 75%, especially about 100% of the interfacial area between the elastomer and the head segment or handle, in any one elastomer/segment interface is fused in this way.

By "without separation of the elastomer from the head segments and/or handle" herein is meant that the elastomer does not become completely detached from the head segments and/or handle. Since even partial loss of attachment of the elastomer to the head segment or handle can compromise the function and/or integrity of the implement, it is preferred that even partial detachment is avoided. In preferred embodiments, the elastomer will become detached over less than about 30%, preferably less than about 15%, more preferably less than about 5% of the fused interfacial area between elastomer and head segment or handle when the elastomer is stretched to at least about 120%, preferably to about 150%, more preferably to about 200% of its unstressed length. The above results should hold true whether the elastomer is stretched by linear deflection, bending or torsional movements of a segment relative to the adjacent segment or handle. Since, for some geometries of segment-segment or segment-handle connections, or for bending or torsional movements of one segment relative to its neighbour, there will be varying extents of elastomer stretching across an interface, care is required in measuring partial detachment. In such cases of differential elastomer extension, at each point on any one interface to be measured, the stretching should be measured along a line drawn through the elastomer which is perpendicular to the interface at the point where separation is to be determined, when the implement is in its rest, unstressed state. In bending or torsional modes it may be that this line will deviate from the perpendicular as one segment is moved relative to the other.

Over its lifetime, an implement having a resiliently flexible head, as described herein, may be subjected to stretching of the elastomer by e.g. bending of the head, many thousands of times. Preferably then, the elastomer-segment bond is able to withstand repeated extension and relaxation of the elastomer, to the extent described above, and back to the rest state through at least 10,000, preferably at least 25,000, more preferably 75,000 extension-relaxation cycles.

In highly preferred embodiments herein the head comprises at least one longitudinal groove which connects transversely disposed bands of elastomer and permits the elastomer to flow from one band to the other during an injection moulding process. In an implement with a co-moulded handle, this longitudinal groove can extend along the handle so that the same elastomer injection point in the mould that is customarily used for supplying elastomer to form handle grips can also be used to inject the elastomer into the void spaces in the head. Normally this longitudinal groove will not extend through the full depth of the handle or head at all points, though it can do so where desired, for instance to provide opposed grip points on top and bottom surfaces of the handle.

The present invention is particularly suitable for the manufacture of implements having a resiliently flexible head. By "resiliently flexible head" is meant herein that when a 3 Newton force is applied to one end of the head, the other end being held fixed, the end to which the force is applied will deflect through an angle of at least 2° and, when the 3 Newton force is removed, the head will return to its original position without the application of external force. The end of the head which is to be held fixed is defined by the line which is perpendicular to the axis along which bending takes place and which touches the first point to comprise a grooming means, such as a row of toothbrush bristles. The end of the head where the force is to be applied is the opposite end of the head at the furthest point away along the bending axis. The angle through which the head bends when a 3 Newton force is applied as above is referred to herein as the flex angle. The flex angle can conveniently be measured by measuring the vertical displacement (y) of the free end of the head under a 3 Newton force and the distance y and the distance between the clamping point and the application of the force (x), the flex angle being derived by the relationship tan(flex angle)=y/x. In preferred embodiments the flex angle is at least 3°, more preferably at least 5° and it can be as high as 15° or more.

In preferred embodiments herein, the implement comprises a grooming means on only one face of the head and that face is concavely shaped. In these embodiments the head preferably has a flex angle such that the concave face is able to bend to the extent that the face can become convex. In its rest state, the face of the head comprising the grooming means can be concave along either its longitudinal or transverse axis. Where the face is concave along the longitudinal axis, the radius of curvature may vary along the length of the head. The radius of curvature is preferably from 10 to 500 mm, more preferably from 15 to 250 mm, especially from 25 to 150 mm.

In use, toothbrushes according to this invention can be used for cleaning the teeth by an entirely conventional tooth brushing hand action, preferably in a manner recommended by dental health authorities. The implement can also be an electrically driven toothbrush.

The invention will now be described by way of example only, with reference to the accompanying drawings in which:

FIG. 4 is a perspective view of a hinged toothbrush according to the invention; the elastomer is not shown in order to show the hinges and grooves more clearly.

FIG. 5 is a schematic showing the measurement of the flex angle.

Figure 1:
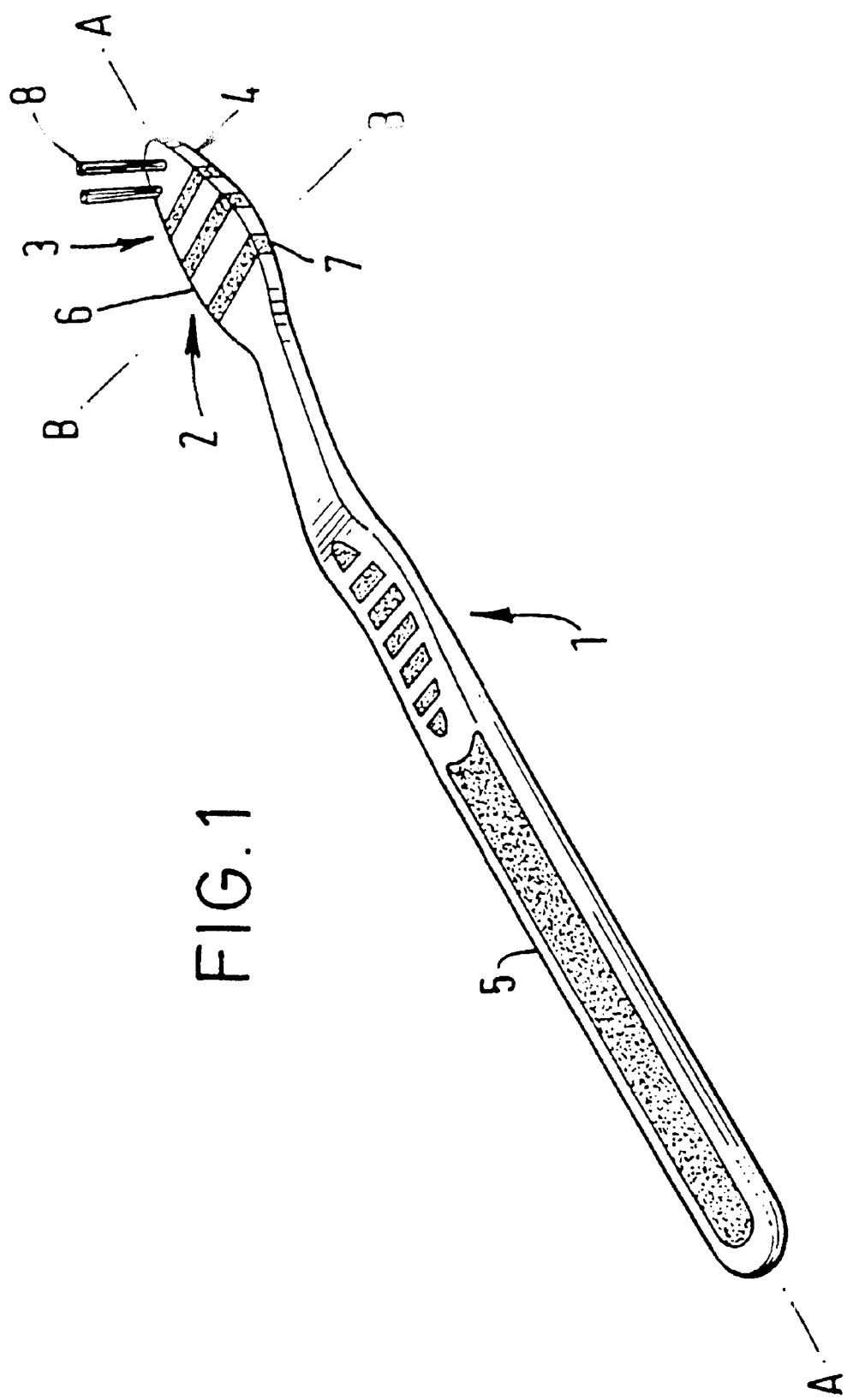
FIG. 1 is a perspective view of a toothbrush according to the invention. Some of the bristles are omitted for the sake of clarity.

Referring to FIG. 1, a toothbrush 1 has a resiliently flexible, flattened head 2, having a top face 3 and bottom face 4 which are substantially parallel to each other, and an elongated polypropylene handle 5. The head comprises four polypropylene segments 6, the first of which is continuous with handle 5. The segments are connected only by bands of a SEBS elastomer 7 having a hardness of 60 Shore A. The segments 6 are longitudinally sequenced along a longitudinal axis A—A. The bands of elastomer 7 extend across the transverse axis of the head B—B and from the top face 3 to the bottom face 4. Tufts of bristles 8 extend from top face 3. In practice, the brush has bristles extending from each of the four segments. Top face 3 is slightly concave, along the longitudinal axis A—A, having a radius of curvature of about 75 mm. The bands of elastomer afford sufficient flexibility to the brush head that it can bend along the longitudinal axis until the top face becomes convex. In doing so the elastomer is stretched along the top face. The elastomer on this face can stretch to more than 200% of its unstressed length without any observable loss of attachment of the elastomer to the segments. The head is able to repeatedly flex to this extent and back to the rest state through 75,000 cycles, without any detachment of the elastomer from the head segments. The handle comprises further regions 9 of the same elastomer to form a functional and attractive grip. The toothbrush is made by sequential injection moulding of first the polypropylene to form the handle 5 and segments 6 and then in a second step the elastomer is injected at a temperature of 255° C., thereby becoming fused to the polypropylene. After the brush has cooled the bristle tufts are inserted by the stapling technique into preformed tuft holes.

Figure 2:
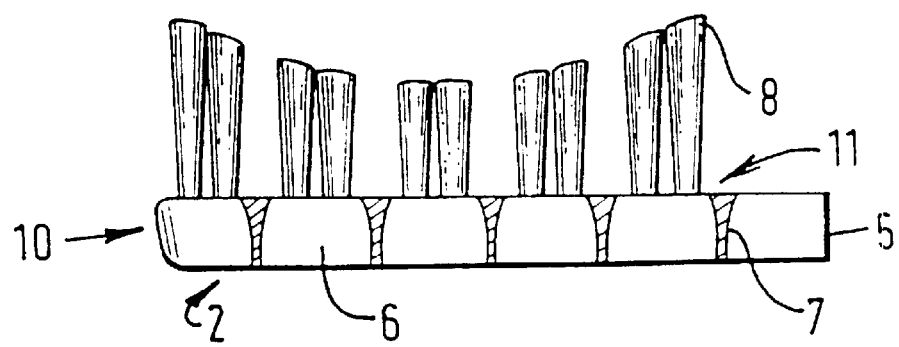
FIG. 2 is a partial side view of the head of a toothbrush according to the invention.

Referring to FIG. 2, a toothbrush head 2 having a free end 10 and handle end 11 is formed integrally at one end of a handle 5. The head includes five segments 6 which are longitudinally sequenced along the head. The segments are flexibly connected by bands of elastomer 7 and the segment nearest the handle end 11 is flexibly connected to the handle 5 only by a band of elastomer. The bands of elastomer 7 extend completely across the transverse axis of the head and taper from the top to the bottom face. Along the top face the bands of elastomer have a width of about 1.2 mm and along the bottom face the bands of elastomer have a width of about 0.8 mm. Tufts of bristles 8 extend from the top face of the head. The toothbrush is made by sequential injection moulding and subsequent tufting as described above.

Figure 3:
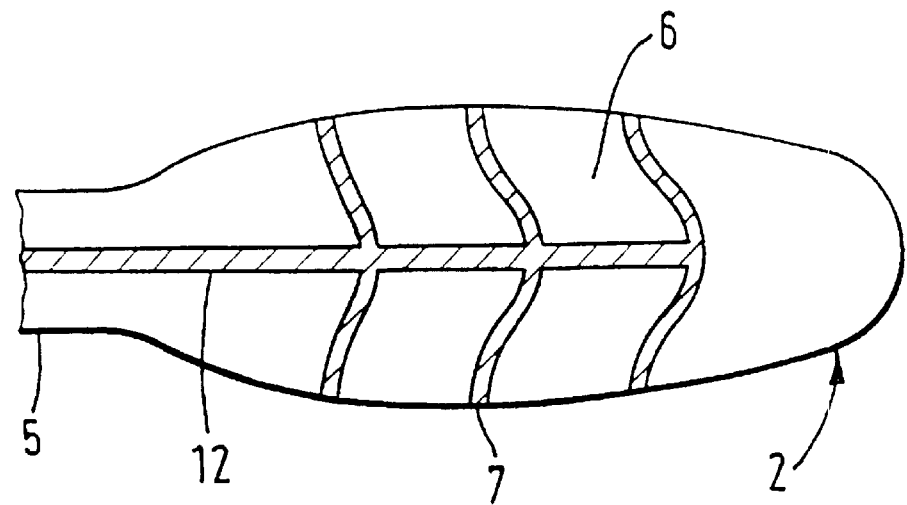
FIG. 3 is a plan view of the bottom face of the head of a brush according to the invention.

Referring to FIG. 3, a toothbrush head 2 is formed integrally at one end of a handle 5. The head includes four segments 6, one of which is continuous with handle 5. The segments are connected only by bands of a SEBS elastomer 7 having a hardness of 60 Shore A and which have a wave profile across the transverse axis of the head. A longitudinal groove 12 extends along the bottom face of the head and the handle, connecting the bands of elastomer so that they can all be formed from a single elastomer injection point.

Referring to FIG. 4, a toothbrush 1 has a head 2 which is co-moulded with the handle 5, the head being concave along its longitudinal axis on the top face 3. Voids 13 in the handle are filled with elastomer to provide hand grips. The voids are connected to each other by a longitudinal groove 12 on the bottom side of the handle which extends into the head and connects transverse grooves 14 between segments 6. The segments are connected by thin hinges 15. The elastomer in the voids and the grooves can be injected from a single injection point 16 and is of a different colour to the head material to give a distinctive appearance. The head has holes 17 disposed on the top surface thereof to accommodate tufts of bristles.

FIG. 5 illustrates the measurement of the flex angle. The head 2 is clamped 18 against the first row of bristles 19 at the end which is attached to the handle 5 and a 3 Newton force (F) is applied to the opposite end. The dashed lines show the original position of the brush head before the force is applied. The vertical displacement (y) of the free end of the head under the force F is measured and the flex angle is derived from the distance y and the distance between the clamping point and the application of the force (x) by the relationship tan(flex angle)=y/x.

What is claimed is:

1. A process for forming a grooming implement, comprising the steps of:
   i) providing a blank comprising a plastic material and having a head and a handle, wherein said head has one or more void spaces which divide said head into at least two segments;
   ii) injecting an elastomer having a modulus of elasticity of less than 500 MPa into said void space at a final injection point at a temperature of at least about 245° C. thereby fusing said elastomer to said segments and forming a resiliently flexible joint, wherein said elastomer is the sole mechanical link between said segments such that said segments can flex relative to each other; and
   iii) where said elastomer can be stretched to at least about 120% of its unstressed length without separation of said elastomer from said segments.

2. The process of claim 1, wherein the grooming implement is a toothbrush.

3. The process of claim 1, wherein said elastomer can be stretched to about 150% of its unstressed length without separation of said elastomer from said segments.

4. The process of claim 1, wherein said elastomer can be stretched to about 200% of its unstressed length without separation of said elastomer from said segments.

5. The process of claim 1, wherein said elastomer is injected at temperature between about 245° C. and about 270° C.

6. The process of claim 1, wherein said elastomer is a polyolefin.

7. The process of claim 6, wherein said polyolefin is a styrene-ethylene-butylene-styrene elastomer.

8. The process of claim 1, wherein said at least two segments are formed from polypropylene.

9. The process of claim 1, wherein said head comprises two bands of said elastomer.

10. The process of claim 1, wherein said elastomer forms a non-linear band.

11. The process of claim 1, wherein said elastomer forms a band and wherein the interfacial walls of said band are substantially perpendicular to a face of said head.

12. The process of claim 11, wherein said face is a top face.

13. The process of claim 1, wherein said elastomer detaches over less than about 5% of the connected interfacial area between said elastomer and said segments when said elastomer is stretched to at least about 120% of its unstressed length.

14. The process of claim 1, wherein said elastomer is injected by an injection molding apparatus having a cylinder and a cylinder nozzle and the temperature in said cylinder is between about 210° C. and about 220° C.

15. The process of claim 14, wherein said injection molding apparatus further comprises a hot runner disposed between said cylinder nozzle and said final injection point, wherein said elastomer is heated to said temperature of at least about 245° C. by said hot runner.

16. A process for forming a toothbrush, comprising the steps of:
   i) providing a blank comprising a plastic material and having a head and a handle, wherein said head has one or more void spaces which divide said head into at least two segments;
   ii) injecting an elastomer having a modulus of elasticity of less than 500 MPa into said void space at a final injection point at a temperature of at least about 245° C. thereby fusing said elastomer to said segments and forming a resiliently flexible joint, wherein said elastomer is the sole mechanical link between said segments such that said segments can flex relative to each other; and
   iii) wherein said elastomer can be stretched to at least about 120% of its unstressed length without separation of said elastomer from said segments and wherein said elastomer detaches over less than about 5% of the connected interfacial area between said elastomer and said segments when said elastomer is stretched to said at least about 120% of its unstressed length.

17. The process of claim 16, wherein said elastomer can be stretched to about 150% of its unstressed length without separation of said elastomer from said segments.

18. The process of claim 1, wherein said elastomer can be stretched to about 200% of its unstressed length without separation of said elastomer from said segments.

19. The process of claim 1, wherein said elastomer is injected at temperature between about 245° C. and about 270° C.

20. The process of claim 19, wherein said elastomer is a polyolefin.

21. The process of claim 1, wherein said elastomer forms a band and wherein the interfacial walls of said band are substantially perpendicular to a face of said head.

22. The process of claim 21, wherein said face is a top face.

23. The process of claim 16, wherein said elastomer is injected by an injection molding apparatus having a cylinder and a cylinder nozzle and the temperature in said cylinder is between about 210° C. and about 220° C.

24. The process of claim 23, wherein said injection molding apparatus further comprises a hot runner disposed between said cylinder nozzle and said final injection point, wherein said elastomer is heated to said temperature of at least about 245° C. by said hot runner.

25. The process of claim 1, wherein said elastomer can be stretched to said 120% of its unstressed length for at least 10,000 extension-relaxation cycles without separation of said elastomer from said segments.

26. The process of claim 25, wherein said elastomer can be stretched to 200% of its unstressed length for at least 25,000 extension-relaxation cycles without separation of said elastomer from said segments.

27. The process of claim 16, wherein said elastomer can be stretched to said 120% of its unstressed length for at least 10,000 extension-relaxation cycles without separation of said elastomer from said segments.

28. The process of claim 27, wherein said elastomer can be stretched to 200% of its unstressed length for at least 25,000 extension-relaxation cycles without separation of said elastomer from said segments.

* * * * *